Figure 1:
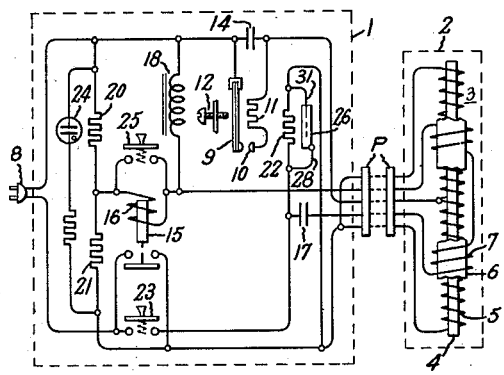

Sept. 23, 1952     J. W. McNAIRY     2,611,854
CONTROL CIRCUIT WITH TEMPERATURE AND/OR HUMIDITY COMPENSATION
Filed Dec. 20, 1949

Inventor:
Jacob W. McNairy,
by *His Attorney.*

Patented Sept. 23, 1952

2,611,854

UNITED STATES PATENT OFFICE 2,611,854

CONTROL CIRCUIT WITH TEMPERATURE AND/OR HUMIDITY COMPENSATION

Jacob W. McNairy, Westport, Conn., assignor to General Electric Company, a corporation of New York Application December 20, 1949, Serial No. 134,002

17 Claims. (Cl. 219—46)

1

My invention relates to electrical control systems, and has for a principal object the improvement of control and signalling circuits in electrical control systems having a sensitive element comprising paired electrical conductors maintained in uniformly spaced relationship by a thin layer of a material which has known and consistent temperature-resistance or humidity-resistance characteristics. More specific objects of my invention include the provision of an electrical control circuit having improved response to temperature and/or humidity of the ambient at said sensitive element; the provision, in a thermostatic control circuit having a temperature sensitive element of substantial length, of temperature compensation means to insure the desired actuation of the control circuit when a small portion of the sensitive element reaches the control temperature even though the remainder of the element may be below said temperature; the provision of means establishing a relatively sharply-defined temperature to which the control circuit will respond; and the provision of means for neutralizing the effect of humidity on the impedance of certain organic materials which may be used as the sensitive medium between the paired conductors, to make said medium more uniformly responsive to a predetermined control level.

As will later appear, my invention is useful in applications in which a work device is to be actuated in response to a predetermined temperature or humidity condition; said work device, for example, may be an alarm signal or a switch cutting off a heat source or other conditioning medium. As a specific example, my invention may usefully be applied to overheat protection circuits for electrically heated blankets and the like in which a flexible heater wire is distributed throughout the blanket area. In such blankets, the electrical energy supplied to the heater wire is under thermostatic control, such as the manually adjustable, cycling type described and claimed in the William K. Kearsley United States Patent No. 2,195,958 dated April 2, 1940. Controls of this type correlate the supply of electrical energy to the blanket to the temperature of the room by opening and closing a switch in the heater circuit more or less frequently according to whether the room has become cooler or warmer. They do not, however, provide means responsive to the blanket temperature to open the heater wire circuit in the event the blanket reaches a dangerously high temperature; and to protect against overheat conditions David C.

2

Spooner, Jr., and Milton S. Greenhalgh have devised a temperature sensitive element for which patent application, Serial No. 91,396 was filed May 4, 1949, and assigned to the assignee herein. Their device comprises a blanket heater wire and a signal wire separated by a thin, uniform layer of organic material, such as nylon, of which the resistance and impedance values relative to temperature decline rather gradually during temperature increase to a certain level, after which the curve gradient becomes quite sharp for the higher temperatures. This threshold temperature level is below that at which any substantial softening of the nylon occurs, but is in a range at which a blanket may scorch if subjected thereto for more than a few minutes. The importance of the nylon layer is that at potentially dangerous temperatures its predictable and repeatable changes of resistance and impedance values are of such magnitude that a control circuit may be conditioned thereby.

The signalling circuit devised by George C. Crowley for use with the Spooner et al. thermosensitive element is described and claimed in application Serial No. 91,402, filed May 4, 1949, now Patent No. 2,565,478, patented August 28, 1951, and also assigned to the present assignee. The circuit associates the signal conductor in a resonant circuit which provides hold-in voltage for an electromagnetically operated dropout relay which controls the heater wire circuit. Current conduction through the organic layer loads the resonant circuit until at the control level of temperature the loading becomes effective to reduce the relay coil voltage below the hold-in level, as the result of which the relay drops out and opens the heater circuit. The values of the circuit components are such that the gradually increasing conductance of a portion of the control layer as it approaches the cutout temperature is ineffective to load the resonant circuit sufficiently to reduce the voltage thereof to the dropout level.

Experience indicates that an overheat condition will ordinarily occur only in a small proportion of the total blanket area, and it has been determined that the control temperature response when such an area of the blanket is overheated is improved, to the extent of reducing the actual excess temperature required at said area for satisfactory control operation, when the average temperature of the blanket heater wire is raised. In other words, the sensitivity of the control circuit to a localized overheat condition is improved as the average blanket temperature increases, Such over-all temperature increase may, however, produce a condition of unstable control operation because of the over-all reduction of impedance of the control layer. My invention compensates for impedance reduction up to the control level. A control circuit embodying my invention may be adjusted to operate with the blanket under average use conditions; for example, with a light covering over the blanket, which will of itself increase the average blanket temperature.

In a preferred form of my invention, I provide a temperature responsive compensator of negative temperature resistance material so arranged that its impedance is related to the average heating value of the electrical energy supplied to the blanket. In at least one aspect of my invention, the compensator is directly associated with the Kearsley cycling control so as to be responsive to the cycling frequency thereof. In another aspect, I associate the compensator directly with the thermosensitive element in the blanket. In any event, the compensator has such value with respect to other circuit constants, for example the hold-in voltage of a relay, that its change in impedance acts in an offsetting relationship to the circuit loading effect of the average temperature increase of the heater and signal wire combination to maintain said hold-in voltage until the control temperature is reached, at which time the further temperature increase of even a small portion of the thermosensitive element will load the control circuit to the cutout point. I consider that my invention provides a sensitivity level which more nearly gives uniform overheat temperature setting for all settings of the cycling temperature control.

In circuits intended primarily for response to certain humidity conditions, and as a humidity responsive compensator in essentially temperature responsive circuits, I provide a device comprising a body of suitable hygroscopic material disposed between circuit elements to serve normally as an insulator thereof and exhibiting reduced impedance upon moisture absorption. In temperature responsive circuits this device offsets the effect of humidity on the impedance of the organic material used as the temperature responsive medium between the signal wire and heater wire; in humidity control circuits it compensates for ambient humidities at locations other than the control area, and through which locations the sensitive element may run.

Figure 2:
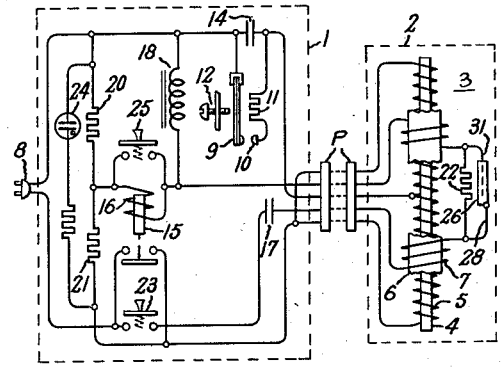
Figure 3:
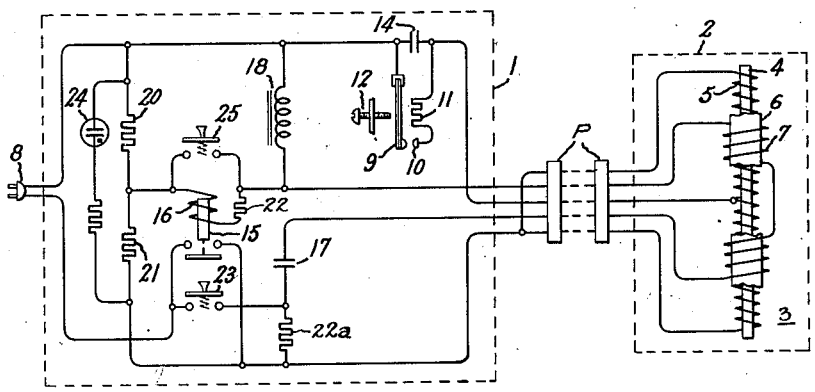
Figure 4:
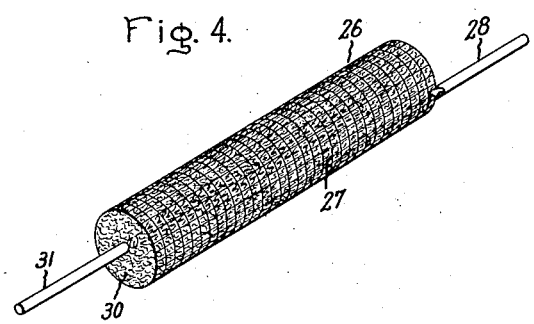
Figure 5:
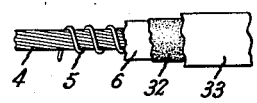

Other features and advantages will be apparent from the following description read in connection with the accompanying drawings in which Figs. 1, 2, and 3 show various circuit arrangements embodying my invention; Fig. 4 is a perspective view of a form of humidity responsive device; and Fig. 5 is a fragmentary perspective view of a form of thermosensitive element.

In consideration of the several circuits shown herein it will be assumed that the enclosure designated 1 represents a control box within which is incorporated a cycling control of the Kearsley type, and the circuit elements for overheat protection. The enclosure represented at 2 comprises the structure or area under control. It will first be assumed that said structure is an electrically heated blanket of conventional type. The blanket may be detachably connected to the control circuit by a suitable plug P. Throughout the major area of the blanket there is arranged a combined heater and signal wire 3 such as shown in the aforementioned Spooner et al. application Serial No. 91,396. Said heater wire includes a flexible core strand 4 of insulation material over which is wound a bare copper ribbon-like wire 5. This wire comprises the heater wire. Over said heater wire in intimate surface contact therewith there is extruded or otherwise placed a thin, sheath-like layer 6 of organic insulation material, such as the nylon material identified by the manufacturers, E. I. du Pont de Nemours and Company, as FM—3604. Tightly wound over said nylon layer is a bare copper conductor 7 which serves as the signal circuit conductor. An outer insulating layer (not shown) is applied over the signal conductor. The nylon layer preferably has a wall thickness of the order of less than .010 inch and serves to maintain the respective conductors 5 and 7 in uniform spaced relationship. As is explained in the said Spooner et al. application, the nylon is normally an insulator but at temperatures below that at which any substantial softening or other disintegration of the nylon occurs its direct and alternating current resistance and impedance values change relatively sharply to a level at which the nylon will conduct significant current at ordinary domestic potential levels, for example, 110 volts A. C.

Within the control box 1 there is disposed a circuit connectible to alternating current electrical energy as by the conventional electric plug 8. In series relationship with the heater wire 5 there is a thermostatic control of the Kearsley type, comprising a bimetallic switch element 9 having at one end a contact cooperating with a fixed contact 10 disposed at the end of a lead wire which includes a resistor 11. In practice said resistor 11 may be wound about the bimetal switch arm 9 for quick heat exchange between the resistor and the bimetal element. It should be stated here that when cool, the bimetal will close the contacts and when it is heated it will move to open its contacts. A suitable adjustment screw 12 is arranged to establish a desired contact adjustment in accordance with the temperature setting desired by the user. The capacitor 14 is for the usual purpose of reducing arcing between the switch contacts. As is explained in the Kearsley Patent No. 2,195,958 the bimetal element 9 is responsive to the temperature represented by the combined temperature effect of the room atmosphere and the resistor 11. When the room temperature drops sufficiently to cause the bimetal to close the switch contacts, the blanket heater wire and the resistor 11 are connected to power. Because of the lowered ambient temperature it will take longer for the heat output of the resistor 11 to raise the bimetal temperature to the opening point. Thus the cycling of the heater wire circuit is related to the room temperature condition, influenced or supplemented by the heat provided by resistor 11, and it follows that the electrical energy input to the blanket is controlled by the proportion of time that the switch is closed to that during which it is open.

The overheat cut-out relay 15 is also in series in the heater wire circuit and the above discussion assumes that the contacts thereof were closed. Relay 15 is intended to open in response to a predetermined high temperature of the temperature sensitive layer 6. Such a control temperature may result, for example, from stifling the normal heat dissipation of the blanket by folding the blanket while leaving it connected to power and with the respective switches "on," or placing additional coverings or other heat insulating bodies on the blanket while it is in operation.

Advantageously, relay 15 is biased to open circuit position and its contacts are closed and retained in closed position during normal blanket operation by the hold-in strength of its electromagnetic operating coil 16. The term "relay" is used generically herein to designate any electric switch in which contacts are held closed by means depending upon the voltage available at an electro-motive operator. As appears in the several circuits shown herein the coil 16 is in series with the signal or control wire 7 and is connected across an impedance bridge comprising a capacitor 17 in a resonant circuit with a choke 18. The other two legs of the bridge comprise the resistors 20, 21.

The constants of the impedance bridge are such that with the temperature of the nylon layer 6 at a normal blanket operation level, at which the nylon is an effective insulator, the resonant circuit will produce about 130 volts at the coil 16. The coil will release the armature at a dropout level of about ninety volts, which is attained when the impedance of the layer 6 at the control level of temperature permits current conduction between conductors 7 and 5 which will load the control circuit sufficiently to reduce the resonance thereof. In the aforementioned application of George C. Crowley, Serial No. 91,402, the normal operating voltage for the relay coil is established at a level below the resonant circuit maximum but substantially above the dropout level by a resistor in series with the capacitor 17.

The effect which the impedance change of the control layer has on the control circuit is in large measure influenced by the proportion of the length of the control layer at the overheat temperature to the length of the layer at the lower, or "normal" temperature. Blankets employ a substantial length of wire—about two hundred feet for a full bed size—and if the temperature of most of it is low, with accompanying high impedance of its control layer, a small length must reach a high temperature for sufficient loading of the control circut to the cut-off point. Merely to increase the temperature of the entire wire length so as to lower the impedance of the whole has heretofore been unsatisfactory because the resonant circuit will then be loaded to such an extent that the voltage at the relay coil may be too close to the cut-off level to insure stability of operation, particularly in the face of substandard potentials sometimes experienced in domestic wiring installations.

I provide for increasing the normal operation temperature of the control layer while maintaining the relay coil voltage at a satisfactory hold-in level by employing, as the aforementioned resistor of the Crowley circuit, a "thermistor," i. e. a resistor utilizing one or more of the metallic oxides having a negative temperature resistance coefficient. By placing the thermistor where it will be subjected to a heating effect indicative of the electrical energy input to the blanket wire, and hence the temperature of said wire, the lowered impedance of the thermistor will offset the lowered impedance of the organic control layer and maintain the relay coil voltage at a satisfactory hold-in level until the control temperature is attained. I can thus increase the temperature of the entire length of blanket wire and accordingly reduce the length of wire which must be raised to the control temperature to produce the lowered impedance necessary to load the resonant circuit to the dropout level. I prefer to employ thermistor 22 within the control circuit cabinet 1 in heat exchange relationship with the resistor 11. It has previously been noted that the energy input to the blanket is controlled by the proportion of time that the bimetallic switch 9 is closed as compared with the open circuit periods of said switch and that the closure of said bimetallic switch energizes the heat producing resistor 11. Therefore the temperature of the negative coefficient resistor 22 may be considered to be a function of the electrical energy input to the blanket. With the value of resistor 22 over a temperature range from cold to that attained following the normal cycling of thermostatic switch 9 under the low ambient temperatures of severe cold weather being such as to establish a desired hold-in voltage for coil 16 it will be seen that the lessened resistance of the thermistor will for a time offset the lessened impedance of the layer 6 and the control circuit loading resulting therefrom to maintain the hold-in voltage until at a predetermined high temperature of a portion of said layer, the resistor 22 can no longer maintain the hold-in level of voltage in opposition to the lowered impedance of the organic layer. Current conduction across the conductors 7 and 5 at this temperature condition will load the resonant circuit to the relay release level.

Switch 15 being normally open, there is provided a manually operable, normally open, switch 23 to complete the operating circuit and energize coil 16 to the pull-in level when the system is to be placed in operation. Indication that the circuit is completed is provided by the glow lamp 24, which will illuminate when switch 15 closes. It will be noted that when switch 23 is closed the resistor 22 is temporarily shunted out of the circuit. The user may cause switch 15 to drop out by manually closing a momentary contact switch 25 bridged across the relay coil 16 to shunt the same out of the circuit.

Organic materials such as nylon are hygroscopic to the extent that under certain humidity conditions the moisture absorption of the control layer 6 may reduce the impedance thereof sufficiently to load the resonant circuit to the cutoff voltage level. Accordingly, I provide a humidity compensator 26 in parallel with the thermistor 22 to provide a conductive path which will offset the circuit loading effect of the nylon layer. A typical humidity compensator, see Fig. 4, may comprise a tube 27 of wire mesh or the like electrically connected to which is a conductor 28. The tube may be packed with material having the approximate hygroscopic characteristics of the nylon layer 6. Such a packing may comprise a mass 30 of felt, nylon crystals, or other suitable material. Said mass is disposed about conductor 31 to insulate the latter from the conductor 28 so long as the mass 30 has high impedance. However, absorption of moisture by the mass reduces its impedance to the conduction level and current will flow between the conductors 28 and 31, tending to maintain the hold-in voltage of coil 16 despite the lowered impedance of the organic layer 6 by reason of moisture absorption under humidity conditions.

The circuit of Fig. 2 is substantially the equivalent of that of Fig. 1 with the exception that the thermistor 22 and the humidity compensator 26 are shown incorporated in the actual blanket structure. Whereas in the Fig. 1 circuit the resistor 22 is subject to a temperature which may be considered a function of the energy supplied to the blanket heater wire, the location of the thermistor and humidity compensator in Fig. 2 makes them responsive to actual blanket temperature and humidity. The equivalent of the circuit of Fig. 2 may be obtained by making the signal conductor itself of a negative temperature resistance material. For example, the signal conductor, corresponding to wire 1, may comprise a Carborundum coating 32 on the nylon layer 6, see Fig. 5. Carbon, and certain known metallic oxides, may also be used. The outer insulation layer 33 may be extruded thereover. In such an arrangement temperature compensation is literally distributed throughout the blanket area.

In Fig. 3 I have placed the thermistor 22 immediately in series with the relay coil 16. Otherwise, the circuit is similar to a circuit in Crowley Serial No. 91,402, resistor 22a assisting in establishing the resonant bridge voltage at coil hold-in level. The operation of said thermistor to maintain the hold-in level of the relay coil is substantially equivalent to the Fig. 1 embodiment, being sufficiently close to the resistor 11 to derive heat therefrom.

Those skilled in the art will recognize that there are numerous other ways of supporting the hold-in level of the relay coil to permit an overall rise of blanket wire temperature. Merely by way of example, I mention the use of a positive temperature coefficient resistor in parallel with coil 16, or a positive temperature coefficient resistor in parallel with capacitor 17.

The subject matter of this application is related also to that of G. C. Crowley, Serial No. 220,440, filed April 11, 1951, and to that of G. C. Crowley, R. G. Holmes, and P. A. Check, Serial No. 236,208, filed July 11, 1951, both assigned to the assignee herein.

While I have shown particular embodiments of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In a control circuit for electric blankets and the like having a heater conductor and a signal conductor coextensive therewith and separated therefrom by a continuous layer of a normally insulating material which upon increase in temperature to a known threshold level exhibits a relatively gradual decrease in impedance and above said level drops relatively sharply, there being a range of temperature commencing before said level at which the impedance is such that the layer will conduct significant current at domestic potentials: the combination of an electric circuit for said heater conductor for connecting it across a source of electrical energy, a control switch for said circuit, said switch being biased to open circuit position, electromagnetic means responsive to voltage within a relatively narrow range for closing said switch, electric circuit means comprising an impedance bridge across which said electromagnetic means is connected, two legs of said bridge comprising a pair of resistors serially connected and the other two legs comprising in series connection a reactance means, said signal conductor and a capacitor, said bridge being tuned to provide voltage across said electromagnetic means within said switch closing range but responsive to the loading effect of conduction through said layer to reduce the voltage below said range, and a resistor of known negative temperature resistance coefficient connected in said electric circuit means, said resistor being physically positioned to be sensible to the heating effect of the energy input to said blanket so that the lowering resistance of said resistor upon temperature increase thereof will offset the gradually declining impedance of said layer and thereby maintain the voltage across said bridge within the switch closing range until the temperature of the layer increases beyond the threshold level.

2. In a control circuit for electric blankets and the like having a heater conductor and a signal conductor coextensive therewith and separated therefrom by a continuous layer of a normally insulating material which upon increase in temperature to a known threshold level exhibits a relatively gradual decrease in impedance and above said level drops relatively sharply, there being a range of temperature commencing before said level at which the impedance is such that the layer will conduct significant current at domestic potentials: the combination of an electric circuit for said heater conductor for connecting it across a source of electrical energy, a control switch for said circuit, said switch being biased to open circuit position, electromagnetic means responsive to voltage within a relatively narrow range for closing said switch, electric circuit means comprising an impedance bridge across which said electromagnetic means is connected, two legs of said bridge comprising a pair of resistors serially connected and the other two legs comprising in series connection a reactance means, said signal conductor and a capacitor, said bridge being tuned under conditions of substantial non-conduction through said layer to provide voltage within said switch closing range, and a resistor of known negative temperature resistance coefficient connected in said electric circuit means, said resistor being in physical relation to said heater conductor to be sensible to the heat output thereof so that the lowering resistance of said resistor upon temperature increase thereof will offset the gradually declining impedance of said thermally sensitive layer and thereby maintain the resonant voltage within the switch closing range until the temperature of the layer increases beyond the threshold level.

3. A control circuit according to claim 1 in which the negative coefficient resistor is connected in a leg of said bridge and disposed within said blanket in heat exchange relation with the heater wire thereof.

4. A control circuit according to claim 1 in which the negative coefficient resistor is connected within said circuit means in series electrical connection with said electromagnetic means.

5. In a control circuit for electric blankets and the like having a heater conductor and a signal conductor coextensive therewith and separated therefrom by a continuous layer of a normally insulating material which upon increase in temperature to a known threshold level exhibits a relatively gradual decrease in impedance and above said threshold level drops relatively sharply, there being a range of temperature commencing before said level at which the impedance is such that the layer will conduct significant current at domestic potentials: the combination of an electric circuit for said heater conductor for connecting it across a source of electrical energy, a control switch for said circuit, said switch being biased to open circuit position, electromagnetic means responsive to voltage within a relatively narrow range for closing said switch, electric circuit means comprising an impedance bridge across which said electromagnetic means is connected, two legs of said bridge comprising a pair of resistors serially connected and the other two legs comprising in series connection a reactance means, said signal conductor and a capacitor, said bridge being tuned under conditions of substantial non-conduction through said layer to provide voltage across said electromagnetic means within said switch closing range, said signal conductor having a negative temperature resistance coefficient so that its lowering resistance upon increase in temperature will offset the resonance loading effect of the gradually declining impedance of said layer and thereby maintain the resonant voltage within the switch closing range until the temperature of the layer increases beyond the threshold level.

6. In a control circuit for electric blankets and the like having a heater conductor and a signal conductor coextensive therewith and separated therefrom by a continuous layer of a normally insulating material which upon increase in temperature to a known point exhibits a consistent decrease in impedance, there being a range of temperature commencing before said control point at which the impedance is such that the layer will conduct significant current at domestic potentials: the combination of an electric circuit for said heater conductor for connecting it across a source of electrical energy, a control switch for said circuit, said switch being biased to open circuit position, electromagnetic means responsive to voltage within a relatively narrow range for closing said switch, electric circuit means comprising an impedance bridge across which said electromagnetic means is connected, two legs of said bridge comprising a pair of resistors serially connected and the other two legs comprising in series connection a reactance means, said signal conductor and a capacitor, said bridge being tuned under conditions of substantial non-conduction of said layer to provide voltage across said electromagnetic means within said switch closing range, said signal conductor being of a negative temperature resistance coefficient material so that its lowering resistance upon increase in temperature will offset the resonance loading effect of the gradually declining impedance of said layer and thereby maintain the resonance voltage within the switch closing range until the temperature of the layer increases beyond said control point.

7. In a control circuit for electric blankets and the like having a heater conductor and a signal conductor coextensive therewith and separated therefrom by a continuous layer of a normally insulating material which upon increase in temperature to a known threshold level exhibits a relatively gradual decrease in impedance and above said level drops relatively sharply, there being a range of temperature commencing before said level at which the impedance is such that the layer will conduct significant current at domestic potentials: the combination of an electric circuit for said heater conductor for connecting it across a source of electrical energy, a first control switch for said circuit, said switch including a thermal sensitive element arranged to close said circuit when cool, a heater coil in series in said circuit to raise the temperature of said element to open said circuit; a second control switch for said circuit, said switch being biased to open circuit position; electromagnetic means responsive to voltage within a relatively narrow range for closing said second switch; electric circuit means comprising an impedance bridge across which said electromagnetic means is connected, two legs of said bridge comprising a pair of resistors serially connected and the other two legs comprising in series connection a reactance means, said signal conductor and a capacitor, said bridge being tuned to provide voltage within said switch closing range, and a resistor of known negative temperature resistance coefficient disposed in said electric circuit means, said resistor being disposed in heat exchange relationship with said heater coil so that its lowering resistance due to the heating effect of said coil will reduce the resistance in the resonant bridge and offset the resonant loading effect of the gradually declining resistance of said layer and maintain the resonance voltage within the switch closing range until the temperature of the layer increases beyond the threshold level.

8. A control system as set forth in claim 7 wherein said resistor of known negative temperature resistance coefficient is connected in the leg of said impedance bridge in which said signal conductor is located.

9. In a control system, a sensing element comprising a heater wire and a signal conductor separated by a layer of normally insulating material which upon increase in temperature gradually decreases in impedance until over a predetermined temperature range said layer will conduct significant current, electric current supply terminals, a circuit connecting the heater wire to said terminals, electric circuit means comprising an impedance bridge connected to said terminals, said impedance bridge having a pair of serially connected resistors forming two bridge legs, the other two bridge legs comprising a reactance means, said signal conductor and a capacitor, a circuit controlling member having an actuating winding connected across said bridge, said circuit controlling member being biased to a first circuit position and being adopted to be held in a second circuit position against the biasing force when said actuating winding is subjected to a voltage of predetermined value, said bridge being tuned to provide a voltage across said actuating winding of a value to maintain said circuit controlling member in its second circuit position as long as the resistance of said layer of normally insulating material remains above a certain value but responsive to flow of current effected by a reduction in the value of the resistance of such material to reduce the voltage across said actuating winding to a value such that said circuit controlling member will move to its first circuit position, and a resistor having a negative temperature resistance coefficient connected in said circuit means and positioned to be subjected to a heating effect which bears a definite relation to the heating effect of the current flowing in said heater wire circuit whereby its decrease in resistance due to temperature increase will offset the gradually decreasing impedance of said normally insulating material.

10. A control system as set forth in claim 9 wherein said resistor having a negative temperature resistance coefficient is connected in a leg of said impedance bridge.

11. A control system as set forth in claim 9 wherein in addition to a resistor having a negative temperature resistance coefficient there is provided connected in circuit therewith a humidity responsive element the resistance of which decreases with increase in its moisture content.

12. A control system as set forth in claim 9 wherein in addition to a resistor having a negative temperature resistance coefficient there is provided connected in parallel therewith a humidity responsive element the resistance of which decreases with increase in its moisture content.

13. A control system as set forth in claim 9 wherein said resistor having a negative temperature resistance coefficient is connected in the leg of said impedance bridge in which said signal conductor is located.

14. In a control circuit for electric blankets and the like having a heater conductor and a signal conductor coextensive therewith and separated therefrom by a continuous layer of a normally insulating material which upon increase in temperature to a known threshold level exhibits a relatively gradual decrease in impedance and above said level drops relatively sharply, there being a range of temperature commencing before said level at which the impedance is such that the layer will conduct significant current at domestic potentials; the combination of an electric circuit for said heater conductor for connecting it across a source of electrical energy, a first control switch for said circuit, said switch including a thermal sensitive element arranged to close said circuit when cool, a heater coil in series in said circuit to raise the temperature of said element to open said circuit; a second control switch for said circuit, said switch being biased to open circuit position; electromagnetic means responsive to voltage within a relatively narrow range for closing said second switch; electric circuit means comprising an impedance bridge across which said electromagnetic means is connected, two legs of said bridge comprising a pair of resistors serially connected and the other two legs comprising in series connection a reactance means, said signal conductor and a capacitor, said bridge being tuned to provide voltage within said switch closing range, and a resistor of known negative temperature resistance coefficient connected in said electric circuit means and positioned to be subjected to a heating effect which bears a definite relation to the heating effect produced by the current flowing in said heater wire whereby its lowering resistance due to the heating will offset the gradually decreasing impedance of said normally insulating material.

15. A control circuit for electric blankets as set forth in claim 14 wherein said resistor having a negative temperature resistance coefficient is positioned adjacent to said heater and signal conductors whereby it is subjected to the temperature thereof.

16. A control circuit for an electric blanket as set forth in claim 14 wherein said resistor having a negative temperature resistance coefficient is connected in the leg of said impedance bridge in which said signal conductor is located and is positioned adjacent to said heater and signal conductors whereby it is subjected to the temperature thereof.

17. In a control system, a sensing element comprising a heater wire and a signal conductor separated by a layer of normally insulating material which upon increase in temperature gradually decreases in impedance until over a predetermined temperature range said layer will conduct significant current, electric current supply terminals, a circuit connecting the heater wire to said terminals, electric circuit means comprising an impedance bridge connected to said terminals, said impedance bridge having a pair of serially connected resistors forming two bridge legs, the other two bridge legs comprising a reactance means, said signal conductor and a capacitor, a circuit controlling member having an actuating winding connected across said bridge, said circuit controlling member being biased to a first circuit position and being adopted to be held in a second circuit position against the biasing force when said actuating winding is subjected to a voltage of predetermined value, said bridge being tuned to provide a voltage across said actuating winding of a value to maintain said circuit controlling member in its second circuit position as long as the resistance of said layer of normally insulating material remains above a certain value but responsive to flow of current effected by a reduction in the value of the resistance of such material to reduce the voltage across said actuating winding to a value such that said circuit controlling member will move to its first circuit position, said bridge having connected therein means having a negative temperature resistance coefficient subjected to a heating effect which bears a definite relation to the heating effect of the current flowing in said heater wire circuit whereby its decrease in resistance due to temperature increase will offset the gradually decreasing impedance of said normally insulating material.

JACOB W. McNAIRY.

REFERENCES CITED

The following references are of record in the file of this patent:

UNITED STATES PATENTS

| Number | Name | Date |
| --- | --- | --- |
| 2,334,530 | Andrews | Nov. 16, 1943 |
| 2,413,125 | Walbridge | Dec. 24, 1946 |
| 2,446,810 | Cook | Aug. 10, 1948 |
| 2,467,856 | Rich | Apr. 19, 1949 |
| 2,565,478 | Crowley | Aug. 28, 1951 |
| 2,581,212 | Spooner et al. | Jan. 1, 1952 |
| 2,588,926 | Holmes | Mar. 11, 1952 |

FOREIGN PATENTS

| Number | Country | Date |
| --- | --- | --- |
| 338,880 | Great Britain | Nov. 18, 1930 |